United States Patent [19]

Havens

[11] 3,708,761

[45] Jan. 2, 1973

[54] CONCENTRIC LINE NEGATIVE RESISTANCE OSCILLATOR

[75] Inventor: Richard Calvin Havens, Scottsdale, Ariz.

[73] Assignee: Motorola, Inc., Franklin Park, Ill.

[22] Filed: March 24, 1971

[21] Appl. No.: 127,578

[52] U.S. Cl...............331/107 R, 331/101, 333/73 C
[51] Int. Cl...............................................H03b 7/12
[58] Field of Search........331/101, 102, 107, 117, 96; 333/73 C

[56] References Cited

UNITED STATES PATENTS 3,162,824 12/1964 Herzog................................331/101
3,416,098 12/1968 Vane...................................331/101
3,605,034 9/1971 Rucker................................331/101

OTHER PUBLICATIONS

Gunn Effect Devices and their Applications, K. Wilson, Mullard Tech. Comm, No. 100, July 1969, pgs. 286–293.

*Primary Examiner*—John Kominski
*Attorney*—Mueller & Aichele

[57] ABSTRACT

A pulsed high frequency, high power negative resistance oscillator is provided which does not change its instantaneous frequency due to pulsing to any perceptible amount and thus achieves a near perfect sin *x*/*x* frequency spectrum. The oscillator can produce up to 10 watts peak power with state of the art Gunn diodes and has a very high frequency stability with change in temperature.

7 Claims, 1 Drawing Figure

PATENTED JAN 2 1973 3,708,761
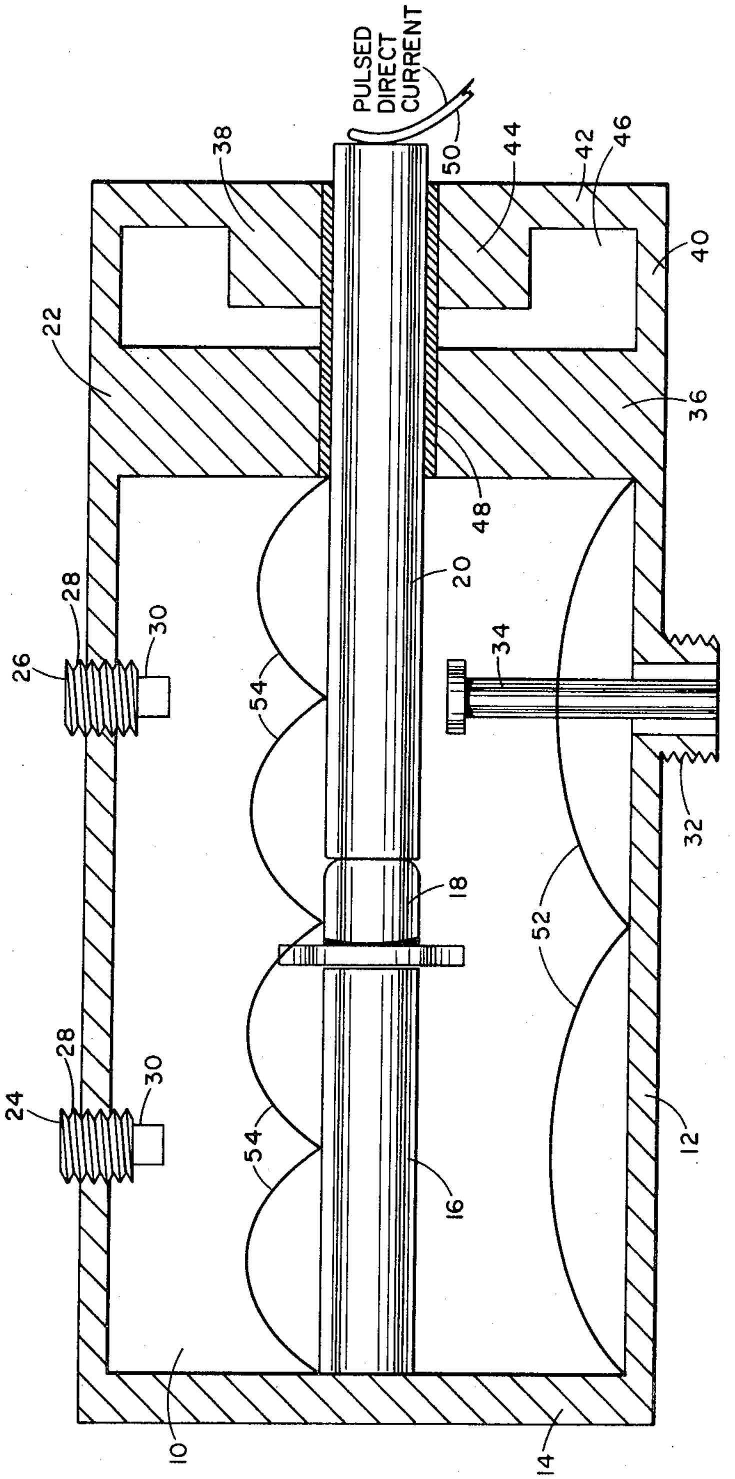
INVENTOR
BY RICHARD CALVIN HAVENS
Mueller & Aichele
ATTY'S.

CONCENTRIC LINE NEGATIVE RESISTANCE OSCILLATOR

BACKGROUND

This invention relates to a pulsed, high frequency, negative resistance oscillator exhibiting high frequency stability.

For certain work, such as radar, it is necessary to provide high frequency, high power pulses whose output frequency does not vary perceptibly during the course of the pulse or due to temperature changes of the oscillator. Prior art high power negative resistance oscillators do not produce the desired output.

It is an object of this invention to produce an improved high frequency negative resistance oscillator.

It is another object of this invention to produce a pulsed high frequency oscillator whose power and frequency do not change perceptibly during the course of the pulse or due to change in temperature.

SUMMARY

A concentric or coaxial line is provided having a diode connected along the length of the central conductor of the line. The length of the line is such that two voltage standing waves of a half wave length long each appears therein. Tuning means are provided projecting into the concentric line through the outer conductor thereof at the midpoints of the voltage standing waves. A coaxial output transmission line is provided to take energy out of the concentric line at the center of a voltage standing wave and means are provided to energize the diode without excessive leakage of produced oscillations along the center transmission line.

DESCRIPTION

The invention will be better understood upon reading the following description in connection with the accompanying drawing in which the single FIGURE illustrates an embodiment of this invention.

Turning to the FIGURE, a concentric or coaxial line 10 is provided. The outer cylindrical conductor 12 of the line 10 is closed at one end by a plate 14. While the plate 14 is shown as integral with the cylinder 12. for convenience of manufacture, the plate 14 and the cylinder 12 may be separate pieces, in fact, in this description, the assembled structure will be described without describing how it is made or how it is assembled since, given the structure, the construction thereof would be obvious to a person skilled in the art. A center cylindrical post 16 extends inwardly of the cylinder 12 and coaxially therewith. A diode 18 of known construction is mounted on the centerpost 16 so that one terminal thereof is connected to the post 16. A further coaxial post 20 is provided which is connected at one end to the other terminal of the diode 18 and which extends out of the concentric line 10 through a closure 22 in direct current insulative relationship therewith, as will be further described. The diode 18 is positioned about at the center of the cavity portion of the line 10. A pair of tuning elements 24 and 26 extend into the cavity portion through the cylinder wall 12. The tuning elements 24 and 26 are both alike and they comprise threaded shanks 28 which threadedly engage the cylinder 12 and inwardly extending metal portions 30. The axis of the tuning elements is perpendicular to the axis of the line 10 and a tuning element 24 is positioned one-quarter of the distance from the closure 14 towards the closure 22, while the tuning element 26 is positioned one-quarter of the distance from the closure 22 towards the closure 14. A coaxial output fitting 32 is provided which is positioned coaxially with a tuning element 26. The coaxial fitting 32 comprises a center conductor 34 which approaches but does not touch the post 20 and a threaded outer portion 32 which is fixed to the cylinder 12.

The closure 22 comprises a wall portion 36 which may be a quarter of a wave length long in the direction parallel to the length of the post 20, and another wall portion 38 which comprises a cylindrical portion 40 which is a continuation, in shape, of the cylinder 12 and a closure portion 38 which comprises an annulus 42 and a concentrically positioned inwardly projecting portion 44 which leaves a dish like open space 46. A very thin insulating sleeve 48 is provided around the post 20 between the post 20 and the closure 22. A wire 50 may be attached to the post 20 for providing direct current to the diode 18 with respect to the cylinder 12, for example. Except as otherwise noted, the structure may all be of a material whose dimensions do not change with temperature, such as "Invar."

In the operation of the circuit as described, a direct voltage is applied between the wire 50 and the outside of the cylinder 10 of sufficient magnitude to cause the diode 18 to exhibit negative resistance. The sleeve 48 prevents short circuit of the applied direct voltage. Oscillations will be provided in the line 10 at a frequency determined by the length of the cavity portion thereof. The curves 52, 52 indicate the voltage standing waves of the desired output frequency of oscillations produced in the coaxial transmission line 10. The curves 54, 54 indicate voltage standing waves of the first harmonic or double frequency, also produced, in the cavity of the line 10. The tuning elements 24 and 30 are positioned so that their axes extend through the nodes of the standing waves 54 and through the anti-nodes of the standing waves 52. The output fitting 32 is positioned at the anti-node of one of the standing waves 52 and at a node of the standing waves 54. Therefore, the output taken at the fitting 32 is of the frequency of the standing waves 52, with very little harmonic component. The tuning elements 24 and 26, by being threaded in or out, adjust the output frequency with negligible effect on the second harmonic so that the standing waves 52 and 54 coincide as shown. This relationship is believed to be responsible for the extremely good frequency stability obtained with certain negative resistance devices. Note should be made that this cavity is approximately one full wavelength long rather than one-half wavelength as in prior known oscillators. Constant instantaneous frequency during the pulse duration is responsible for a "clean frequency spectrum." Essentially perfect $(\sin x)/x$ frequency spectrums are achieved with the disclosed oscillator. The structure being of a material whose dimensions do not vary with temperature changes, temperature cannot affect the output frequency. While the reactance of the diode 18 changes with temperature and also with diode pulsing as a result of heating during the pulse, due to the structure as described, this change of reactance has no perceptible effect on the frequency of the output waves.

Therefore, the wave at the output fitting 32 is constant in frequency although the diode 18 is pulsed with direct current applied to the wire 50 and although, in operation, the described oscillator will change in temperature.

The closure 22 substantially prevents leakage of oscillations along the post 20. This is due to the fact that the dished portion 46 has a radio frequency length of about one-quarter of a wavelength and because the gap between the closure portions 36 and 42 and the post 20 that extends therethrough is less than the axial distance between the inwardly extending portion 44 and the closure portion 36.

What is claimed is:

1. A negative resistance oscillator which may be pulsed and whose frequency varies imperceptibly during the pulsing comprising:

a concentric line including a cavity whose length is essentially equal to one full wave length at the fundamental frequency, and within which cavity there exists standing wave patterns at said fundamental frequency and at a harmonic of twice said fundamental frequency, a negative resistance diode positioned along the centerpost of said concentric line essentially at the center of said cavity, at least one tuning element extending through the outer wall of said concentric line into said cavity perpendicularly to said concentric line and substantially midway between the center and one end of said cavity, and an output connection extending through the outer wall of said concentric line into said cavity perpendicularly to said concentric line, and substantially midway between the center of said cavity and either end of said cavity.

2. The negative resistance oscillator according to claim 1 in which said negative resistance diode is positioned at approximately a node of the fundamental frequency voltage standing wave pattern and also a node of the second harmonic frequency.

3. The negative resistance oscillator according to claim 1 in which said tuning element is at an anti-node of the voltage standing wave of the fundamental frequency and a node of the second harmonic frequency.

4. The negative resistance oscillator according to claim 1 in which said output connection is located so as to couple out the fundamental frequency but not the second harmonic.

5. The negative resistance oscillator according to claim 3 in which a second tuning element extend into said cavity at another fundamental anti-node and another second harmonic node.

6. The negative resistance oscillator according to claim 1 in which said centerpost extends out of said cavity through an end enclosure which includes a pair of conductive members producing a dish like cavity having a radial length equal to about one-quarter of a wavelength.

7. The negative resistance oscillator according to claim 1 wherein said output connection is disposed adjacent the same end of said cavity as said tuning element.

* * * * *